United States Patent [19]

Penaluna

[11] Patent Number: 5,601,859
[45] Date of Patent: Feb. 11, 1997

[54] CHEWING GUM INDIVIDUALLY WRAPPED WITH WRAPPER BEARING TRANSFERABLE TATTOO

[75] Inventor: Joanne Penaluna, Winston-Salem, N.C.

[73] Assignee: Nabisco Inc, Parsippany, N.J.

[21] Appl. No.: 382,064

[22] Filed: Feb. 1, 1995

[51] Int. Cl.$^6$ .................................................. B65D 85/60
[52] U.S. Cl. .............................. 426/5; 426/87; 426/104; 426/112
[58] Field of Search ................................. 426/5, 87, 104, 426/112, 132, 383, 415; 427/146, 149, 152; 428/914

[56] References Cited

U.S. PATENT DOCUMENTS

| | | | |
|---|---|---|---|
| 3,800,497 | 4/1974 | Pearson . | |
| 4,024,287 | 5/1977 | Golchert | 426/383 |
| 4,169,169 | 9/1979 | Kitabatake | 427/149 |
| 4,285,978 | 8/1981 | Quinlivan | 426/383 |
| 4,397,871 | 8/1983 | Meyer et al. | 426/104 X |
| 4,853,240 | 8/1989 | McShane | 426/104 |
| 4,943,063 | 7/1990 | Moreau | 426/104 |
| 5,362,500 | 11/1994 | Mazurek et al. | 426/5 |

OTHER PUBLICATIONS

*The Wiley Encyclopedia of Packaging Technology*, p. 697, 1986, p. 1300.

Hawley, *Condensed Chemical Dictionary*, p. 706, 1977, p. 1300.

*Primary Examiner*—Arthur L. Corbin

[57] ABSTRACT

A chewing gum product comprises an individual-sized piece of chewing gym wrapped in a flexible paper wrapper wherein the side of the wrapper in contact with the gum is coated with wax, and the other side of the wrapper contains no wax or adhesive and carries at least one complete design of ink comprising vegetable dye and polyvinyl alcohol which is transferable as a tattoo by wetting the design with water and pressing it against the surface to which the tattoo is to be transferred.

5 Claims, No Drawings

CHEWING GUM INDIVIDUALLY WRAPPED WITH WRAPPER BEARING TRANSFERABLE TATTOO

BACKGROUND OF THE INVENTION

The present invention relates to chewing gum and more particularly chewing gum in the form of conventionally sized individual sticks each of which is wrapped in its own wrapper. More specifically, the present invention relates to wrapped sticks of chewing gum wherein the wrapper is imprinted on its exterior with one or more complete designs which can be transferred to a person's skin in a simple manner.

It has long been known to provide chewing gum in the form of sticks of gum each of which is in the size of a single serving of gum as an integral, flat, usually rectangular piece of gum. It has also long been known that it is preferable to package such sticks of gum for the consumer in a form wherein each stick is individually wrapped, following which the wrapped sticks of gum are collected together into a package in which the sticks of gum are sold and thereafter carried by the consumer. Wrapping each stick of gum prevents adjacent sticks in the package from adhering to each other, keeps the sticks free of unwanted contact with other materials with which the package comes in contact, and also helps to preserve freshness by preventing or retarding the loss of moisture and of other relatively volatile components such as flavoring agents.

From time to time, the wrappers used to wrap individual sticks of gum have been imprinted with designs or patterns, to enhance the attractiveness and enjoyment of the product. However, such designs and patterns have been permanently affixed to the wrapper. It has not previously been known to provide onto the wrapper a design which is in addition a removable tattoo that can be affixed to the skin of the consumer. This is believed to be due to any of several factors, relating principally to the fact that transferable tattoo-type products are usually thought to require several additional manufacturing steps which add to the expense and complexity of such a manufacturing operation. For instance, transferable designs which must be peeled from the wrapper and affixed to the skin require a separate layer of adhesive, and must be thick enough to withstand being peeled from the wrapper and then adhered to the skin. Such a layer adds to the overall thickness of each stick of gum, thereby reducing the number of sticks which can be packaged in the overall package of gum. However, it has been believed necessary to provide transferable tattoos in such a form to ensure that the pattern remains integral, that is, the pattern retains its appearance without material change or distortion.

Thus, there remains a need in this field for chewing gum products which are provided in the form of individually wrapped sticks of gum wherein the wrappers carry thereon a design or pattern which is inexpensive to produce, which does not require additional steps or apparatus which disrupt the manufacturing and packaging procedures, yet which is easily and integrally removed from the wrapper surface and affixed to the skin of the user.

The present invention achieves these objectives and others which will be apparent from the following description.

BRIEF SUMMARY OF THE INVENTION

The present invention comprises an individual stick of chewing gum wrapped in a paper wrapper having an inner surface which contacts said gum and an outer surface, wherein the inner surface of said wrapper is coated with a food grade wax and the outer surface of said wrapper does not contain wax and is imprinted with one or more complete patterns formed of ink comprising food grade vegetable dye and food grade polyvinyl alcohol, wherein no adhesive is present on said outer surface, which one or more patterns are integrally transferable from said wrapper to the skin upon moistening of the ink sufficiently to effect the release of the one or more patterns from the wrapper.

DETAILED DESCRIPTION OF THE INVENTION

The present invention is applicable with any chewing gum product capable of being formed into sticks of the shape and dimensions conventionally employed in sticks of chewing gum commercially sold at present. The chewing gum can be bubble gum, or conventional gum, and can have any of a variety of colors, patterns, flavors and so forth. The art is replete with examples of formulations of chewing gum that can be provided in stick form, any of which will be useful in the present invention.

The preferred shape of the individual-size gum piece is the conventional stick form. It will be recognized that the present invention is also applicable to gum products wherein each piece of gum is in the form of squares, circles, and the like, provided that as described below at least one complete transferable pattern is imprinted onto each wrapper encasing an individual size piece of gum.

The wrapper in which each stick is wrapped in accordance with the present invention can be formed of any paper useful for wrapping chewing gum. Such paper needs to be relatively thin and durable, and must be capable of being imprinted using conventional printing machinery with inks having the composition described below that is used to make the transferrable tattoo pattern on the wrapper. A preferred example of such paper is bleached 18# paper (i.e. paper having a weight of 18 pounds per ream) which has a relatively smooth hard finish yet is readily folded in high speed wrapping machinery to make the gum products of the present invention.

One side of the paper wrapper carries a thin, integral layer of wax. Any food grade wax can be used. Preferred examples include medium to high molecular weight paraffin waxes, as well as beeswax and the like. The wax coating provides a hydrophobic barrier layer which retards or prevents transmission of moisture through the paper comprising the wrapper. The wax layer also reduces or, preferably, prevents adhesion of the stick of gum to the wrapper. As will be discussed more fully below, the wax layer is also essential to achieving proper imprinting of the transferable pattern onto the wrapper, and to achieving proper release of the integral pattern from the wrapper onto the skin of the user. The wax layer is very thin, as a film, to permit the wrapper to remain flexible enough to be folded as necessary to wrap the piece of gum, without causing the wax to crease or flake off. A satisfactory wax loading is about 2.5–3.5 pounds of wax per ream of paper.

The side of the wrapper paper opposite to the side which carries the wax layer carries at least one separate, integral design or pattern which comprises the transferable tattoos of interest. There is literally an infinite number of possible designs or patterns that can be employed, ranging from depictions of real or fanciful animals, sports figures, toys, game objects, characters, letters, words, numbers, and so forth. As the wrapper paper is usually provided in large sheets which are then cut into smaller sections used as the wrappers, the large sheets of wrapper paper will be imprinted with many complete tattoo designs. However, it is essential to the present invention that each individual wrapper of a size used to wrap an individual piece of chewing gum carries at least one complete design or pattern which comprises the removable tattoo for that wrapper. Since the large sheets of paper are necessarily cut into smaller individual-sized pieces it will be understood that some of the designs or patterns are also cut and are therefore in only partial form on the wrapper for an individual-sized piece of gum.

The designs and patterns are affixed to the unwaxed side of the paper using standard flexographic printing machinery and procedures. In general, ink formulations suitable for printing the designs and patterns onto the paper comprise 10–20 wt. % of one or more vegetable colorants, 35–50 wt. % water, and 45–60 wt. % of polyvinyl alcohol (food grade). After printing, the water dries leaving behind the patterns on the paper. Preferably, the designs and patterns constituting the tattoos are imprinted after the side of the paper not to receive the tattoos has been waxed with the paraffin or equivalent wax described hereinabove. However, it is possible to apply the wax surface after application of the tattoos to the nonwaxed surface of the paper. As has been indicated above, the presence of the wax on the surface opposite to the surface which receives the tattoos is essential to achieving acceptable transfer of the tattoos to the skin.

Each individual wrapper used to wrap an individual stick of gum can be assured of having at least one complete, uncut integral design or pattern to be used as a tattoo, as follows. The plurality of designs and patterns are preferably printed in a regular array of rows and columns of designs and patterns. The lines formed by each row and column of patterns and designs should be at an angle to the lines along which the sheet is cut. Thus, on a rectangular sheet of wrapper paper, adjacent rows and columns of each individual design or pattern should be offset from each other so that when a sheet is cut from side to side, a cut which passes through a pattern or design in one row passes between the patterns or designs in the next neighboring row, and so forth. If the distance between cuts is set sufficiently wide, then each individual wrapper piece generated by a pair of cuts will necessarily include at least one uncut design or pattern. Then, adjusting the spacing between the respective designs and patterns on the paper sheet permits adjustment of the dimensions of the individual wrapper to the desired length and width which will enable the individual wrapper to completely envelop the individual piece of gum.

The transferable designs and patterns constituting the tattoos are composed of one or more food grade vegetable dyes and polyvinyl alcohol. Optionally, preferably, a small amount of a soap can also be present in the ink formulation. The vegetable dyes are safe and approved FD & C colorants such as Yellow 5, Blue 1, Red 40, and the like. Of course, depending on the color desired for the design, it is possible to use one colorant, different colorants in different parts of the design, or blends of such colorants to provide additional color(s) that are not available from any one colorant.

Food grade polyvinyl alcohol is also present in the ink composition, to serve as a binder for the ink itself and to help the ink to adhere, removably, to the unwaxed side of the paper wrapper. No other layer of carrier, paper, adhesive, or other layer or substance needs to be present. Generally, the ratio of colorants to polyvinyl alcohol is about 1:6 to 1:2 by weight. Generally, a small amount of entrained water may be present, given that the designs are applied to the paper surface from an aqueous preparation containing the colorants and the polyvinyl alcohol.

It is also advantageous to imprint the side of the wrapper which carries the removable design or pattern with lettering that spells out a short set of instructions to the user which instruct the user how to transfer the pattern from the paper wrapper to the skin. Preferably, this lettering should be affixed in a permanent, non-transferrable ink. Examples of such inks which are suitable for use on wrappers that may come into contact with an ingestible product such as chewing gum are well known and readily available.

The actual affixing of the transferrable design and the instructions, if any, is straightforward and can readily be integrated into the existing machinery and process for preparing wrappers and wrapping the individual sticks of gum, without modifying the machinery significantly. Thus, master rolls of the paper are printed with repeating designs and patterns constituting the tattoos. The arrangement of the designs and patterns on the paper, and the relative spacing between the designs and patterns and between rows and columns of designs and patterns are as set forth hereinabove. The master rolls are then slit to the widths required for a single stick of gum. The resulting slit rolls are then fit to conventional machinery which cuts off a wrapper of a size for wrapping individual sticks of gum and which wraps the individual piece of gum in its wrapper.

The individually wrapped individual sticks of gum are then collected and grouped according to the number of sticks desired to be packaged and sold as an integral package. They are then ready for sale to the consumer public.

The transferable pattern can be transferred as a tattoo to any surface. Users will often want to transfer the pattern to the skin as a playful, temporary design. When it is desired to transfer the pattern from the wrapper, for instance, to the skin, the user simply moistens the skin with water. The user then simply presses the side of the wrapper which carries the design or pattern to the portion of the skin (or other moistened surface) to which the user desires to apply the tattoo. The person holds or presses the wrapper to that portion of the skin for a few seconds and then removes the wrapper and discards it. The ink formulation that has been discovered for use in this invention becomes hydrated and accomplishes rapid integral transfer of the design onto the skin, where it remains without running or smearing until the user desires to remove it. Removal can be effected simply by washing the area of skin with soap and water.

The present invention affords several advantages not heretofore realized in chewing gum packaging. The wrappers prepared in accordance with the foregoing description are easy to prepare without requiring modification in existing packaging machinery and procedures. In addition, the procedure for preparing and affixing the tattoos is itself simple and inexpensive. If desired, the designs and patterns can be varied whenever desired, perhaps to reflect changing seasonal themes or to incorporate characters or symbols that have elsewhere become popularized. The transferable patterns and designs themselves are flexible, and do not require additional adhesive, support, or the like, which would add to the expense and which would complicate the process of transferring the tattoo to the skin. In addition, the formulations that have been discovered for use in the present invention are advantageous in that they do not smear or smudge prior to the actual transfer, and do not transfer accidentally to adjoining product or wrappers.

What is claimed is:

1. A product comprising an individual stick of chewing gum wrapped in a paper wrapper having an inner surface which contacts said gum and an outer surface, wherein the inner surface of said wrapper is coated with a food grade wax and the outer surface of said wrapper does not contain wax, does not contain adhesive, and is imprinted with one or more complete patterns formed of ink comprising food grade vegetable dye and food grade polyvinyl alcohol, wherein said one or more complete patterns are integrally transferable from said wrapper to human skin upon moistening of the ink sufficiently with water to effect release of the pattern from the wrapper.

2. A product according to claim 1 wherein said wax comprises paraffin wax.

3. A product according to claim 1 wherein said wrapper is imprinted with one complete pattern and with one or more incomplete portions of patterns.

4. A product according to claim 1 wherein the wrapper is also imprinted, on the same side of the wrapper as said complete patterns, with use instructions in permanent, non-transferable ink.

5. A product according to claim 1 wherein the polyvinyl alcohol and dye in said ink on said wrapper are present in a weight ratio of polyvinyl alcohol: dye of 2:1 to 6:1.

* * * * *